(12) United States Patent
Brand

(10) Patent No.: US 9,825,697 B2
(45) Date of Patent: Nov. 21, 2017

(54) COLLECTIVE REMOTE SIGNALING DEVICE

(71) Applicant: PHOENIX CONTACT GMBH & CO. KG, Blomberg (DE)

(72) Inventor: Friedrich-Eckhard Brand, Barntrup (DE)

(73) Assignee: PHOENIX CONTACT GMBH & CO. KG (DE)

( * ) Notice: Subject to any disclaimer, the term of this patent is extended or adjusted under 35 U.S.C. 154(b) by 0 days.

(21) Appl. No.: 15/320,843

(22) PCT Filed: Jun. 30, 2015

(86) PCT No.: PCT/EP2015/064911
§ 371 (c)(1),
(2) Date: Dec. 21, 2016

(87) PCT Pub. No.: WO2016/001264
PCT Pub. Date: Jan. 7, 2016

(65) Prior Publication Data
US 2017/0170892 A1    Jun. 15, 2017

(30) Foreign Application Priority Data
Jun. 30, 2014   (DE) .......................... 10 2014 212 628

(51) Int. Cl.
*H04B 10/00*   (2013.01)
*H04B 10/071*   (2013.01)
(Continued)

(52) U.S. Cl.
CPC ............. *H04B 10/071* (2013.01); *G08B 1/08* (2013.01); *G08B 7/00* (2013.01); *G08B 21/185* (2013.01); *G08C 23/06* (2013.01); *H04B 10/50* (2013.01)

(58) Field of Classification Search
CPC ......... G08C 23/06; G04B 23/02; G05B 23/02
(Continued)

(56) References Cited

U.S. PATENT DOCUMENTS 6,002,501 A * 12/1999 Smith ..................... G01M 3/28
356/44
6,313,751 B1 * 11/2001 Whitmire ............ B60L 11/1851
320/112
(Continued)

FOREIGN PATENT DOCUMENTS

DE            3017277 A1   11/1981
DE      102013213721       *  1/2006 ........... G08B 17/103
(Continued)

OTHER PUBLICATIONS

International Search Report prepared by the European Patent Office on Sep. 18, 2015, for International Application No. PCT/EP2015/064911.

*Primary Examiner* — Li Liu
(74) *Attorney, Agent, or Firm* — Sheridan Ross P.C.

(57) ABSTRACT

The subject matter of the invention is a collective remote signaling device for a plurality of serially-arranged devices, wherein each of the devices has an optical signaling unit, with the devices being arranged on a mounting rail, wherein the collective remote signaling device (FM) is likewise arranged on the mounting rail, with the collective remote signaling device having an optical sensor, wherein the optical sensor is connected to the optical signaling units of the devices via an optical waveguide, wherein a state which is displayed by means of one of the optical signaling units at one of the devices is relayed via the optical waveguide to the optical sensor, and is detected in the collective remote signaling device and signaled, with the collective remote signaling device having an optical transmitter, with the optical transmitter being connected to the optical signaling (Continued)

units of the devices via the optical waveguide and light is provided at least for a time to the optical signaling units, whereupon the optical signaling unit changes the return flow of the light provided upon a change in state.

9 Claims, 2 Drawing Sheets

(51) Int. Cl.
  *G08B 1/08* (2006.01)
  *G08B 7/00* (2006.01)
  *H04B 10/50* (2013.01)
  *G08B 21/18* (2006.01)
  *G08C 23/06* (2006.01)
(58) Field of Classification Search
  USPC .............................. 398/9–33, 170, 140, 141
  See application file for complete search history.

(56) References Cited

U.S. PATENT DOCUMENTS

| | | | | |
|---|---|---|---|---|
| 6,980,108 B1* | 12/2005 | Gebbia | ................ | G08B 13/124 340/541 |
| 7,852,213 B2* | 12/2010 | Browning, Jr. | ...... | G08B 13/186 250/227.14 |
| 7,856,157 B2* | 12/2010 | Beinhocker | ............... | F17D 5/00 385/12 |
| 7,956,316 B2* | 6/2011 | Browning, Jr. | ...... | G08B 13/124 250/221 |
| 8,401,401 B2* | 3/2013 | Hartog | ................... | H04B 10/61 398/152 |
| 2006/0197665 A1* | 9/2006 | Shibata | ................ | G08B 13/124 340/557 |
| 2008/0122617 A1* | 5/2008 | Browning | ............ | G02B 6/4416 340/541 |
| 2008/0266087 A1* | 10/2008 | Tatar | .................... | G08B 13/124 340/555 |
| 2010/0061723 A1* | 3/2010 | Heimlicher | ............ | G01D 5/246 398/28 |
| 2012/0070285 A1 | 3/2012 | Cousineau | | |
| 2013/0010395 A1* | 1/2013 | Birkholz | .............. | H01R 9/2641 361/91.1 |
| 2014/0231636 A1* | 8/2014 | Goldner | ................. | G01H 9/004 250/227.11 |
| 2017/0039826 A1* | 2/2017 | Cojocaur | ............... | G08B 13/124 |

FOREIGN PATENT DOCUMENTS

| | | |
|---|---|---|
| DE | 10 2011 082 124 A1 | 3/2013 |
| DE | 10 2013 213 721 A1 | 5/2014 |
| EP | 0 417 422 A2 | 3/1991 |
| JP | H08-82649 * | 3/1996 ............. G01R 31/08 |
| JP | H08 82649 A | 3/1996 |

\* cited by examiner

COLLECTIVE REMOTE SIGNALING DEVICE

CROSS REFERENCE TO RELATED APPLICATIONS

This application is a national stage application under 35 U.S.C. 371 and claims the benefit of PCT Application No. PCT/EP2015/064911 having an international filing date of 30 Jun. 2015, which designated the United States, which PCT application claimed the benefit of German Patent Application No. 10 2014 212 628.2 filed 30 Jun. 2014, the disclosure of each of which are incorporated herein by reference.

BACKGROUND

The invention concerns a collective remote signaling device.

Many switchgear technology devices are known in the prior art. They generally exhibit some form of status and/or state signaling.

From US publication US 2012/070 285 A1, an independent distributed protection and safety system with fiber-optic transmission to individual I/O modules is known. The system distributes data to a monitoring device via a fiber-optic line and controls emergency operations. From patent application DE 30 17 277 A1, a monitoring device for the exterior lighting of automobiles is known which individually monitors the operational state of exterior lights. EP 0 417 422 A2 shows an arrangement for the control and monitoring of automobile brake lights, which each brake light being monitored with its own glass fiber.

The problem arises, however—especially in larger switching layouts—that any fault that arises must be found by laborious on-site troubleshooting.

SUMMARY

It would therefore be desirable to provide collective remote signaling, especially for existing layouts, so that one can search for a fault in a more targeted manner.

The solution of the problem is achieved according to the invention by the features of the independent claims. Advantageous embodiments of the invention are indicated in the subclaims.

The invention shall be explained more closely below with reference to the appended drawing by means of preferred embodiments.

BRIEF DESCRIPTION OF THE DRAWINGS

There are shown
FIG. 1 a first embodiment of the invention prior to use,
FIG. 2 the first embodiment of the invention in use,
FIG. 3 a first processing option according to one aspect of the invention,
FIG. 4 a second processing option according to another aspect of the invention, and
FIG. 5 an embodiment of the invention in use, processed according to aspects of the invention.

DETAILED DESCRIPTION

Figure 1:
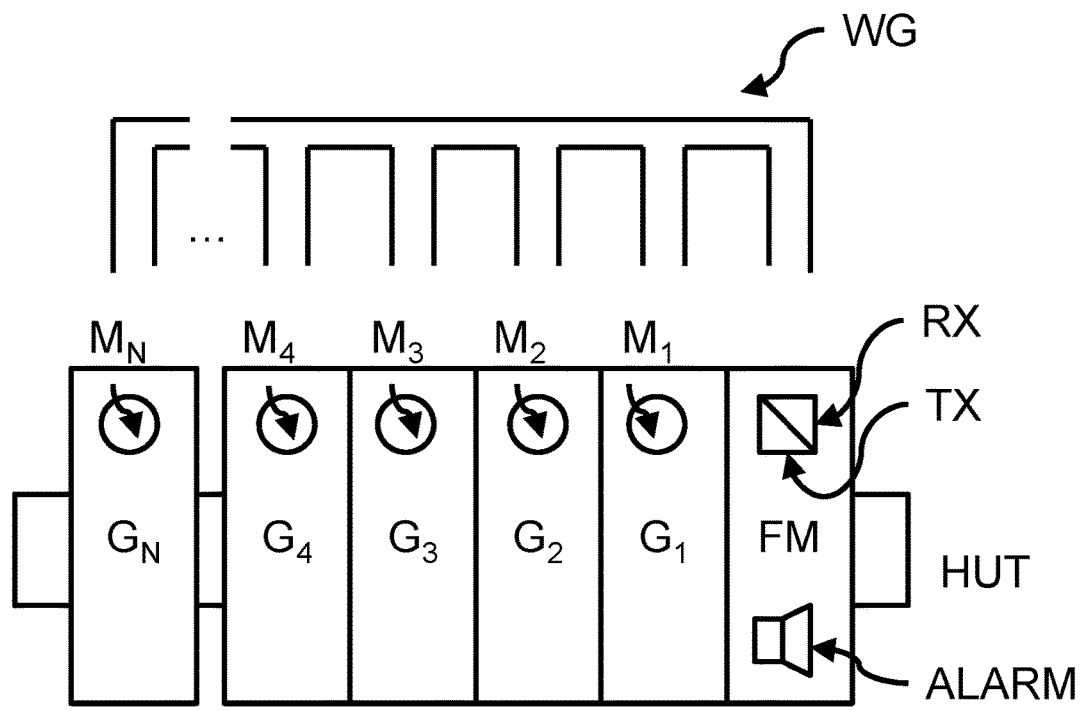
Figure 2:
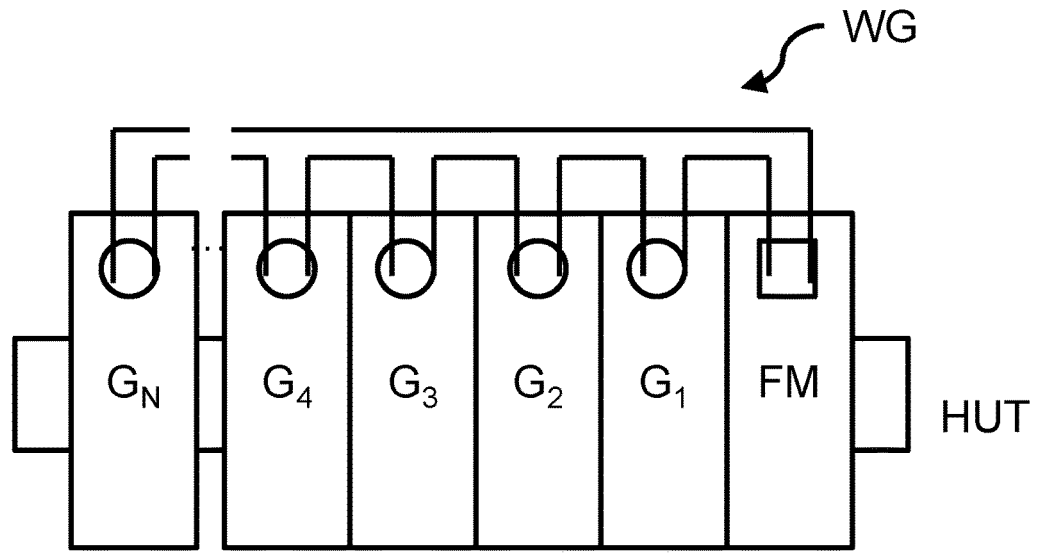

FIGS. 1 and 2 show a first embodiment of the invention before and in use.

A collective remote signaling device FM for a plurality of serially-arranged devices $G_1, G_2, G_3, G_4, \ldots G_N$ is provided.

Each device $G_1, G_2, G_3, G_4, \ldots, G_N$ has at least one optical signaling unit $M_1, M_2, M_3, M_4, \ldots M_N$, such as a status or operating display, which can be outfitted both passively, e.g., with a changing of color or transparency, and actively, with a lighting means.

The devices $G_1, G_2, G_3, G_4, \ldots G_N$ here are arranged on a mounting rail HUT. Examples of mounting rails include cap rails, DIN rails, G-rails, etc.

Furthermore, a collective remote signaling device FM can likewise be arranged on the mounting rail HUT, with the collective remote signaling device FM having an optical sensor RX, wherein the optical sensor RX is connected to the optical signaling units $M_1, M_2, M_3, M_4, \ldots, M_N$ of the devices $G_1, G_2, G_3, G_4, \ldots, G_N$ via an optical waveguide WG.

Then, a state which is actively indicated by means of one of the optical signaling units $M_1, M_2, M_3, M_4, \ldots M_N$ at one of the devices $G_1, G_2, G_3, G_4, \ldots G_N$ can be relayed via the optical waveguide W to the optical sensor RX. The relayed state is then detected in the collective remote signaling device FM and reported by means of a local alarm device or a remote signaling ALARM. In the case of a local alarm device ALARM, a corresponding light display, for example in the form of a LED, or a display such as an EPaper display, and/or an acoustic alarm device ALARM such as a buzzer, a piezoelectric sound generator, etc. can be used.

With the proposed system, collective messages for a plurality of devices, including different kinds of device, can be provided in a simple manner. Thus, the system is outstandingly suited to the retrofitting of existing layouts as well.

In an especially simple configuration, the sensor RX can be built, for example, with a phototransistor or a photodiode, or with a photosensitive resistor.

In one modification of the invention, not only active optical signaling units $M_1, M_2, M_3, M_4, \ldots M_N$, such as status LED(s) or reporting lights, are detected, but it is also possible to detect passive optical signaling units $M_1, M_2, M_3, M_4, \ldots M_N$. For this, the collective remote signaling device has an optical transmitter TX, the optical transmitter TX being connected to the optical signaling units $M_1, M_2, M_3, M_4, \ldots M_N$ of the devices $G_1, G_2, G_3, G_4, \ldots G_N$ via the optical waveguide WG, and light is provided at least for a time to the optical signaling units $M_1, M_2, M_3, M_4, \ldots, M_N$. Upon a change in state, the optical signaling unit $M_1, M_2, M_3, M_4, \ldots M_N$ thus changes the return flow of the light provided. This change can be determined as a change in intensity or a change in spectrum by one or more sensors RX.

In one advantageous configuration of the invention, the change in the light provided comprises a filtering, a wavelength-dependent reflection, a wavelength-dependent transmission, a wavelength-independent reflection or a wavelength-independent transmission.

With the proposed system, collective messages for a plurality of devices, including different kinds of device, can be provided in a simple manner. Thus, the system is outstandingly suited to the retrofitting of existing layouts as well, especially those layouts in which on account of the passive design of the signaling units at the devices there has thus far been no simple and economical possibility of providing a collective signaling.

Especially advantageously, the waveguide WG in the invention can be provided as a stranded or rolled product.

For example, the optical waveguide WG can have weblike branches as shown in the figures, each of which is connected to the signaling units.

Figure 3:
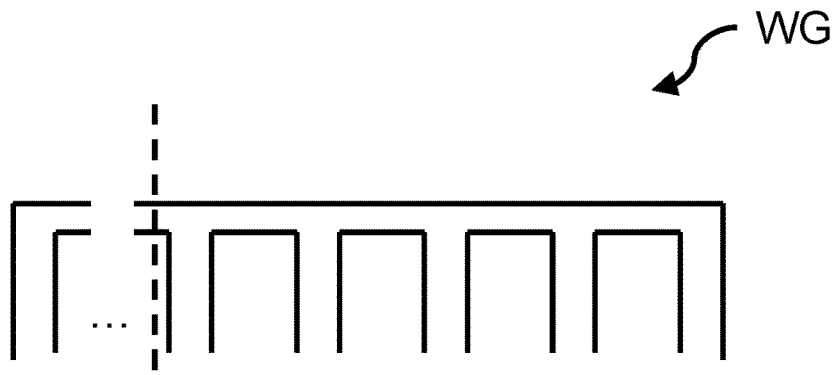

If each of the signaling units at the devices is to be found in the same arrangement and the devices have a uniform grid size, then according to one aspect of the invention a corresponding piece of a waveguide WG can be separated for example from a strand or a roll, as shown in FIG. 3, by breaking or cutting it off. For this, suitable breaking notches (not shown) can be arranged opposite the webs.

In this way, the waveguides WG can be easily adapted by separating them on site, for example, by a technician.

Figure 4:
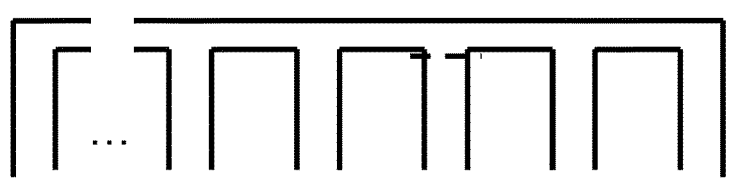
Figure 5:
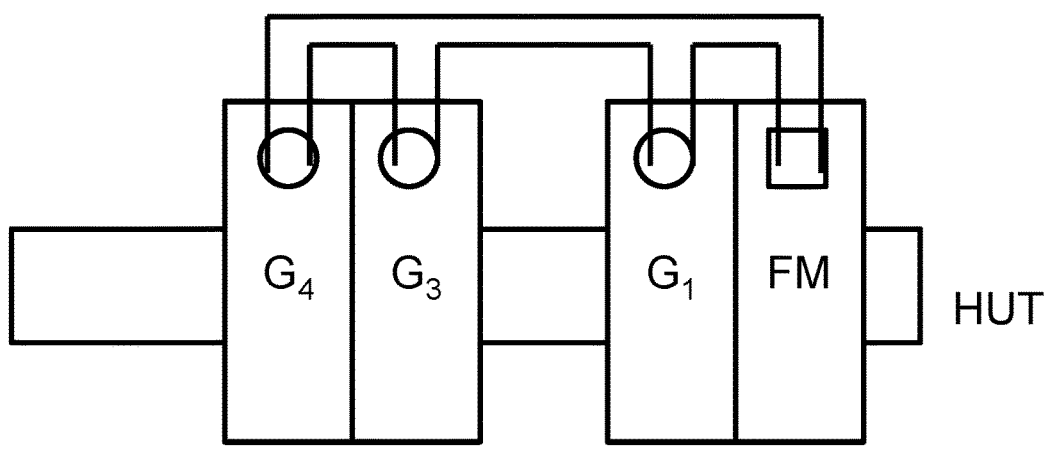

Furthermore, "weak points" can also be created, wherein according to another aspect of the invention the webs of the waveguide WG itself are also separated by breaking or cutting, as shown in FIG. 4. For this, suitable breaking notches (not shown) can be arranged at the webs.

In this way, individual webs of the waveguide WG can be easily removed by separation on site, for example by a technician, so that only signaling units of the devices are detected and not any ambient light, for example.

The optical waveguide WG can be fabricated especially easily from a molded plastic part. Suitable plastic materials have a corresponding index of refraction so that light can be guided by total reflection to the sensor RX, and any light from a transmitter TX can be guided to the signaling units.

For example, the optical waveguide WG can comprise polycarbonate (PC) or polymethylmethacrylate (PMMA).

Especially advantageously, the invention can be used in layouts with devices from the field of overvoltage protection equipment and/or power supply equipment and/or interfaces and/or measurement transducers and is therefore best suited to switchgear technology.

LIST OF REFERENCE NUMBERS

Collective remote signaling device FM
Serially-arranged devices $G_1, G_2, G_3, G_4, \ldots G_N$
Optical signaling unit $M_1, M_2, M_3, M_4, \ldots M_N$
Mounting rail HUT)
Optical sensor RX
Optical waveguide WG
Remote signaling device ALARM

What is claimed is:

1. A collective remote signaling device for a plurality of serially-arranged devices, wherein each of the devices has an optical signaling unit, with the devices being arranged on a mounting rail, wherein the collective remote signaling device is likewise arranged on the mounting rail, with the collective remote signaling device having an optical sensor, wherein the optical sensor is connected to the optical signaling units of the devices via an optical waveguide, wherein a state which is displayed by means of one of the optical signaling units at one of the devices is relayed via the optical waveguide to the optical sensor, and is detected in the collective remote signaling device and signaled, with the collective remote signaling device having an optical transmitter, with the optical transmitter being connected to the optical signaling units of the devices via the optical waveguide and light is provided at least for a time to the optical signaling units, whereupon the optical signaling unit changes the return flow of the light provided upon a change in state.

2. The collective remote signaling device according to claim 1, wherein the sensor is chosen from a group comprising phototransistor, photodiode, photosensitive resistor.

3. The collective remote signaling device according to claim 1, wherein the change in the light provided comprises a filtering, a wavelength-dependent reflection, a wavelength-dependent transmission, a wavelength-independent reflection or a wavelength-independent transmission.

4. The collective remote signaling device according to claim 1, wherein the optical waveguide comprises weblike branches.

5. The collective remote signaling device according to claim 4, wherein the weblike branches can be separated.

6. The collective remote signaling device according to claim 1, wherein the optical waveguide is a molded plastic part.

7. The collective remote signaling device according to claim 1, wherein the optical waveguide comprises polycarbonate or polymethylmethacrylate.

8. The collective remote signaling device according to claim 1, wherein the signaling occurs by means of a remote signaling device and/or an acoustic and/or an optical warning device.

9. The collective remote signaling device according to claim 1, wherein the devices are chosen from a group comprising overvoltage protection equipment, power supply equipment, interfaces, measurement transducers.

* * * * *